United States Patent
Sadr et al.

(10) Patent No.: US 12,530,817 B2
(45) Date of Patent: Jan. 20, 2026

(54) PLATFORM FOR ENABLING MULTIPLE USERS TO GENERATE AND USE NEURAL RADIANCE FIELD MODELS

(71) Applicant: Google LLC, Mountain View, CA (US)

(72) Inventors: Arash Sadr, Belmont, CA (US); Igor Bonaci, Canton Schwyz (CH)

(73) Assignee: GOOGLE LLC, Mountain View, CA (US)

(*) Notice: Subject to any disclaimer, the term of this patent is extended or adjusted under 35 U.S.C. 154(b) by 434 days.

(21) Appl. No.: 18/169,425

(22) Filed: Feb. 15, 2023

(65) Prior Publication Data

US 2024/0202987 A1    Jun. 20, 2024

Related U.S. Application Data

(60) Provisional application No. 63/433,559, filed on Dec. 19, 2022, provisional application No. 63/433,111, filed on Dec. 16, 2022.

(51) Int. Cl.
*G06T 11/00* (2006.01)
*G06T 7/70* (2017.01)

(52) U.S. Cl.
CPC ............... *G06T 11/00* (2013.01); *G06T 7/70* (2017.01); *G06T 2207/20081* (2013.01); *G06T 2207/20084* (2013.01)

(58) Field of Classification Search
CPC . G06T 11/33; G06T 7/70; G06T 2207/20081; G06T 2207/20084; G06T 11/00
See application file for complete search history.

(56) References Cited

U.S. PATENT DOCUMENTS

| | | |
|---|---|---|
| 10,319,150 B1 | 6/2019 | Canada et al. |
| 2020/0226816 A1* | 7/2020 | Kar .......................... G06T 7/50 |
| 2021/0263963 A1 | 8/2021 | Cho et al. |
| 2022/0239844 A1* | 7/2022 | Lv .......................... G06T 15/205 |
| 2022/0277510 A1* | 9/2022 | Funt .......................... G06N 3/04 |
| 2024/0070972 A1 | 2/2024 | Kosiorek et al. |
| 2025/0086896 A1* | 3/2025 | Litany .................... G06V 10/25 |

FOREIGN PATENT DOCUMENTS

| | | | | |
|---|---|---|---|---|
| CN | 115222862 A | * 10/2022 | ............. | G06F 16/53 |
| JP | 2018041459 | 3/2018 | | |
| JP | 2022534082 | 7/2022 | | |
| WO | WO-2024071519 A1 | * 4/2024 | ............... | G06F 3/01 |

* cited by examiner

*Primary Examiner* — Syed Haider
(74) *Attorney, Agent, or Firm* — DORITY & MANNING P.A.

(57) ABSTRACT

Systems and methods for enabling users to generate and utilize neural radiance field models can include obtaining user image data and training one or more neural radiance field models based on the user image data. The systems and methods can include obtaining user images based on a determination that the user images depicted objects of a particular object type. The trained neural radiance field models can then be utilized for view synthesis image generation of the particular user objects.

15 Claims, 15 Drawing Sheets

PLATFORM FOR ENABLING MULTIPLE USERS TO GENERATE AND USE NEURAL RADIANCE FIELD MODELS

RELATED APPLICATIONS

This application claims priority to and the benefit of U.S. Provisional Patent Application No. 63/433,111, filed Dec. 16, 2022, and U.S. Provisional Patent Application No. 63/433,559, filed Dec. 19, 2022. U.S. Provisional Patent Application No. 63/433,111 and U.S. Provisional Patent Application No. 63/433,559 are hereby incorporated by reference in their entirety.

FIELD

The present disclosure relates generally to a platform for enabling a plurality of users to generate and use neural radiance field models to generate virtual representations of user objects. More particularly, the present disclosure relates to obtaining user images and training one or more neural radiance field models to generate one or more novel view synthesis images of one or more objects depicted in the user images.

BACKGROUND

Three-dimensional modeling, object segmentation, and novel view rendering can be inaccessible to users. Such features can be helpful for search, visualizing rearranged environments, understanding objects, and comparing objects without having to have objects physically side by side. Previous techniques for virtually viewing objects relied heavily on photography and/or a large quantity of data, which may include videos. Photographs include two-dimensional viewing from a single and/or a limited number of views. Videos are similarly limited to the data explicitly captured. User access to three-dimensional modeling techniques may be inaccessible to users based on a time cost and/or a lack of knowledge of modeling programs.

Additionally, pictures may only provide a limited amount of information to a user. Size and compatibility with a new environment can be difficult to understand from an image. For example, a user may desire to rearrange their room; however, rearranging the room physically can be cumbersome just to view a possibility. A user using an image can rely heavily on imagination for size, lighting, and orientation understanding.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining user image data and request data. The user image data can be descriptive of one or more images including one or more user objects. The one or more images may have been generated with a user computing device. The operations can include training one or more neural radiance field models based on the user image data. The one or more neural radiance field models may be trained to generate a view synthesis of the one or more objects. The operations can include generating one or more view synthesis images with the one or more neural radiance field models based on the request data. In some implementations, the one or more view synthesis images can include one or more renderings of the one or more objects.

Another example aspect of the present disclosure is directed to a computer-implemented method for virtual closet generation. The method can include obtaining, by a computing system including one or more processors, a plurality of user images. Each of the plurality of user images can include one or more articles of clothing. In some implementations, the plurality of user images can be associated with a plurality of different articles of clothing. The method can include training, by the computing system, a respective neural radiance field model for each respective article of clothing of the plurality of different articles of clothing. Each respective neural radiance field model can be trained to generate one or more view synthesis renderings of a particular respective article of clothing. The method can include storing, by the computing system, each respective neural radiance field model in a collection database. The method can include providing, by the computing system, a virtual closet interface. The virtual closet interface can provide a plurality of clothing view synthesis renderings for display based on the plurality of respective neural radiance field models. The plurality of clothing view synthesis renderings can be associated with at least a subset of the plurality of different articles of clothing.

Another example aspect of the present disclosure is directed to one or more non-transitory computer-readable media that collectively store instructions that, when executed by one or more computing devices, cause the one or more computing devices to perform operations. The operations can include obtaining a plurality of user image datasets. Each user image dataset of the plurality of user image datasets can be descriptive of one or more images including one or more objects. In some implementations, the one or more images may have been generated with a user computing device. The operations can include processing the plurality of user image datasets with one or more classification models to determine a subset of the plurality of user image datasets that includes features descriptive of one or more particular object types. The operations can include training a plurality of neural radiance field models based on the subset of the plurality of user image datasets. In some implementations, each respective neural radiance field model can be trained to generate a view synthesis of one or more particular objects of a respective user image dataset of the subset of the plurality of user image datasets. The operations can include generating a plurality of view synthesis renderings with the plurality of neural radiance field models. The plurality of view synthesis renderings can be descriptive of a plurality of different objects of the particular object type. The operations can include providing a user interface for viewing the plurality of view synthesis renderings.

The systems and methods can be utilized to learn three-dimensional representations of user objects, which can then be utilized to generate virtual catalogs of user objects. Additionally and/or alternatively, the systems and methods can be utilized to compare user objects and/or other objects. The comparison may be aided by rendering view synthesis renderings of different objects with uniform lighting and/or uniform posing. For example, images of differing objects may depict the objects in differing lighting, position, and/or distance. The systems and methods disclosed herein can be utilized to learn three-dimensional representations of the objects and may generate view synthesis renderings of the differing objects with uniform lighting, uniform posing, and/or uniform scaling.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
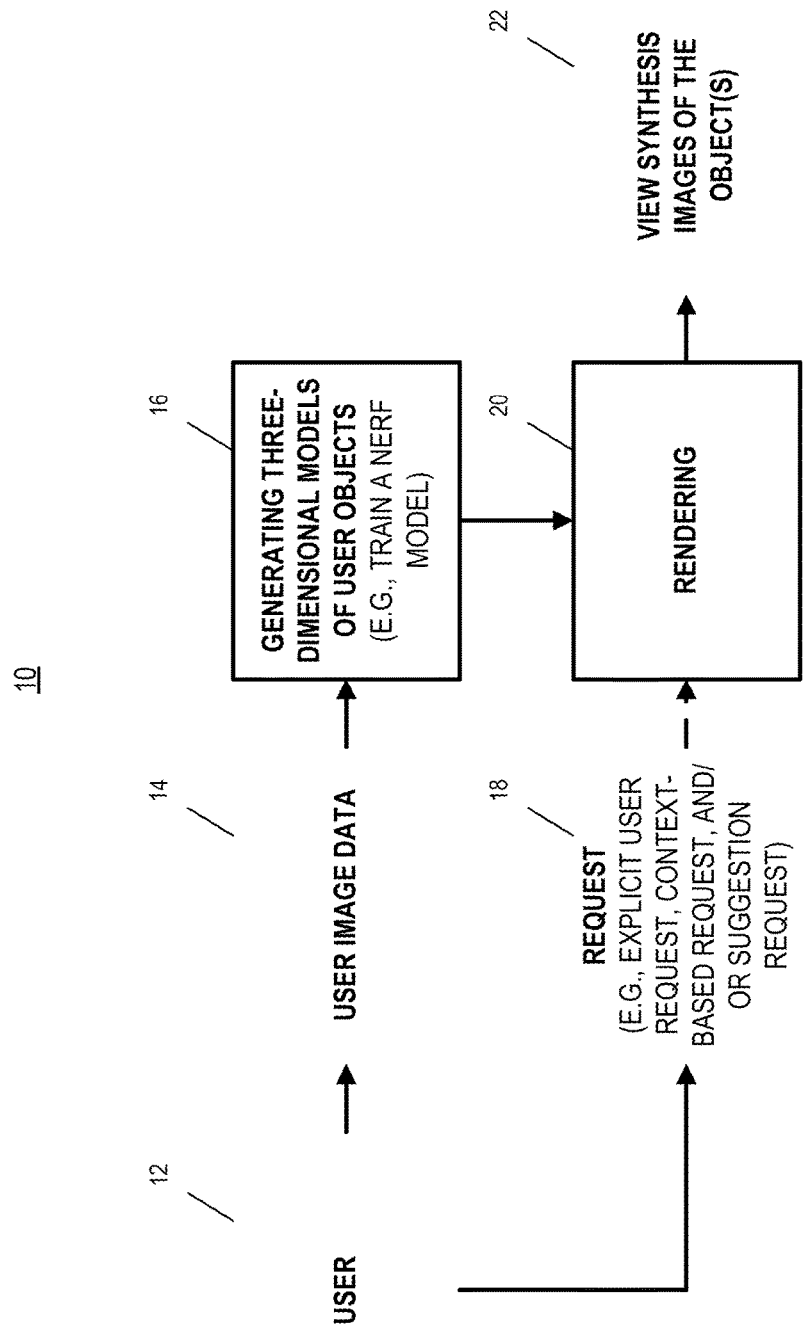
FIG. 1 depicts a block diagram of an example view synthesis image generation system according to example embodiments of the present disclosure.

Reference numerals that are repeated across plural figures are intended to identify the same features in various implementations.

DETAILED DESCRIPTION

Generally, the present disclosure is directed to systems and methods for providing a platform for users to train and/or utilize neural radiance field models for user object rendering. In particular, the systems and methods disclosed herein can leverage one or more neural radiance field models and user images to learn three-dimensional representations of user objects. The trained neural radiance field models can allow users to rearrange their environment via augmented-reality, which can circumvent the physically taxing process of manually rearranging a room just to move the objects back if the appearance is not what the user desires. Additionally and/or alternatively, the trained neural radiance field models can be utilized to generate virtual catalogs of user objects (e.g., a virtual closet). The virtual catalogs can include uniform pose and/or uniform lighting rendering, which can allow for a uniform depiction of user objects (e.g., for object comparison). Additionally and/or alternatively, novel view synthesis image generation can be utilized to view the various objects from various positions and directions without physically traversing the environment.

The trained neural radiance field models can enable users to create their own live try-on experience that is geometrically aware. The utilization at an individual-based level can allow each individual user and/or a collection of users to train neural radiance fields that may be personalized to their objects and/or objects in their environment. The personalization can enable virtual rearrangements, virtual comparisons, and/or geometrically-aware and positionally-aware visualization anywhere. Additionally and/or alternatively, the systems and methods can include view synthesis renderings of differing objects with uniform lighting, uniform posing, uniform positioning, and/or uniform scaling to provide a platform to compare objects with contextually-aware rendering.

Three-dimensional modeling, object segmentation, and novel view rendering can traditionally be inaccessible to users based on previous techniques. Such features can be helpful for search, visualizing rearranged environments, understanding objects, and comparing objects without having to have objects physically side by side.

The systems and methods disclosed herein can utilize a platform for providing neural radiance fields (NERF) techniques to users to allow users to create, store, share, and view high quality 3D content at a widespread level. The systems and methods can aid in remodeling, outfit designs, object comparison, and/or catalog generation (e.g., merchants can build high quality 3D content for products and add to their website).

In some implementations, the systems and methods disclosed herein can be utilized to generate a three-dimensional model of user objects and to render synthetic images of user objects. The systems and methods may utilize objects from a user's photo collection to learn the three-dimensional models. The learned three-dimensional model(s) may be utilized to render a specific combination of object(s) and environment that can be controlled by a user and/or may be controlled based on a context such as a user's search history. Additionally and/or alternatively, the user can manipulate the rendering(s) (e.g., "scroll"). For example, novel view synthesis using the trained neural radiance field model(s) can be utilized to allow a user to view the objects from different views without physically traversing an environment.

The platform for enabling users to generate and utilize neural radiance field models can allow users to be able to visualize "their" objects with other object(s) and/or other environments. Additionally and/or alternatively, the specific combination of object(s) and/or environment can be a function of unique inputs such as search history, object characteristics such as availability, price, etc., which can provide a contextually-aware and user-specific experience.

Additionally and/or alternatively, the systems and methods disclosed herein can include a platform that provides an interface for users to train neural radiance field models on user-generated content (e.g., images) provided by the user. The trained neural radiance field models can be utilized to generate virtual representations of user objects that can be added to user collections, which can be utilized for organization, comparisons, sharing, etc. The user collections can include a virtual closet, a virtual furniture catalog, a virtual collectibles catalog (e.g., a user may generate virtual representations of their physical collections (e.g., a bobblehead collection)), and/or virtual trophy collection. The platform can enable users to generate photorealistic view renderings from a plurality of different perspectives, which can be accessed and displayed even when a user is not proximate to the physical object. The platform can include sharing among users, which can be utilized for social media, marketplaces, and/or messaging.

The systems and methods of the present disclosure provide a number of technical effects and benefits. As one example, the system and methods can learn three-dimensional representations of user objects based on user images to provide view synthesis renderings of user objects. In particular, images captured with a user computing device can be processed to classify and/or segment objects. A three-dimensional modeling representation can then be learned for the one or more objects in the user images by training a neural radiance field model. The trained neural radiance field model can then be utilized for augmented-reality rendering, novel view synthesis, and/or instance interpolation.

Another technical benefit of the systems and methods of the present disclosure is the ability to leverage one or more view synthesis images to provide a virtual catalog of user objects. For example, a plurality of neural radiance field models can be utilized to generate a plurality of view synthesis renderings of a plurality of user objects. The view synthesis renderings may be generated and/or augmented based on uniform lighting, uniform scaling, and/or uniform posing. The plurality of view renderings can be provided via a user interface for a user to easily view their objects from their phone or other computing device.

Another example of technical effect and benefit relates to improved computational efficiency and improvements in the functioning of a computing system. For example, the systems and methods disclosed herein can leverage user images to reduce the computational cost of searching for images of the object online and can ensure the correct object is being modeled.

With reference now to the Figures, example embodiments of the present disclosure will be discussed in further detail.

FIG. 1 depicts a block diagram of an example view synthesis image generation system 10 according to example embodiments of the present disclosure. In particular, the view synthesis image generation system 10 can obtain user image data 14 and/or request data 18 from a user 12 (e.g., from a user computing system). The user image data 14 and/or the request data 18 can be obtained in response to a time event, one or more user inputs, an application download and profile setup, and/or a trigger event determination. The user image data 14 and/or the request data 18 may be obtained via one or more interactions with a platform (e.g., a web platform). In some implementations, an application programming interface associated with a platform can obtain and/or generate the user image data 14 and/or the request data 18 in response to one or more inputs. The user 12 can be an individual, a retailer, a manufacturer, a service provider, and/or another entity.

The user image data 14 can be utilized to generate three-dimensional models of user objects 16 depicted in the user image data 16. Generating the three-dimensional models 16 can include learning a three-dimensional representation of the respective objects by training one or more neural radiance field models on the user image data 14.

A rendering block 20 can process the request data 18 and can utilize the generated three-dimensional models to render one or more view synthesis images of the object(s) 22. The request data 18 can be descriptive of an explicit user request to generate a view synthesis rendering in a user's environment (e.g., an augmented-reality rendering) and/or a user request to render the one or more objects in combination with one or more additional objects or features. The request data 18 may be descriptive of a context and/or parameters that may affect how the object is rendered (e.g., lighting, size of environmental objects, time of day, position and direction of other objects in the environment, and/or other contexts associated with the generation). The request data 18 may be generated and/or obtained in response to a context of the user.

The view synthesis images of the objects 22 can be provided via a view finder, a static image, a catalog user interface, and/or via a virtual reality experience. The generated view synthesis images 22 may be stored locally and/or on a server in association with a user profile. In some implementations, the view synthesis images of the objects 22 can be stored by a platform via one or more server computing systems associated with the platform. Additionally and/or alternatively, the view synthesis images of the objects 22 may be provided for display and/or interacted with via a user interface associated with the platform. A user may add the view synthesis images of the objects 22 to one or more collections associated with the user, which may then be viewed as a collective via a collections user interface.

Figure 2:
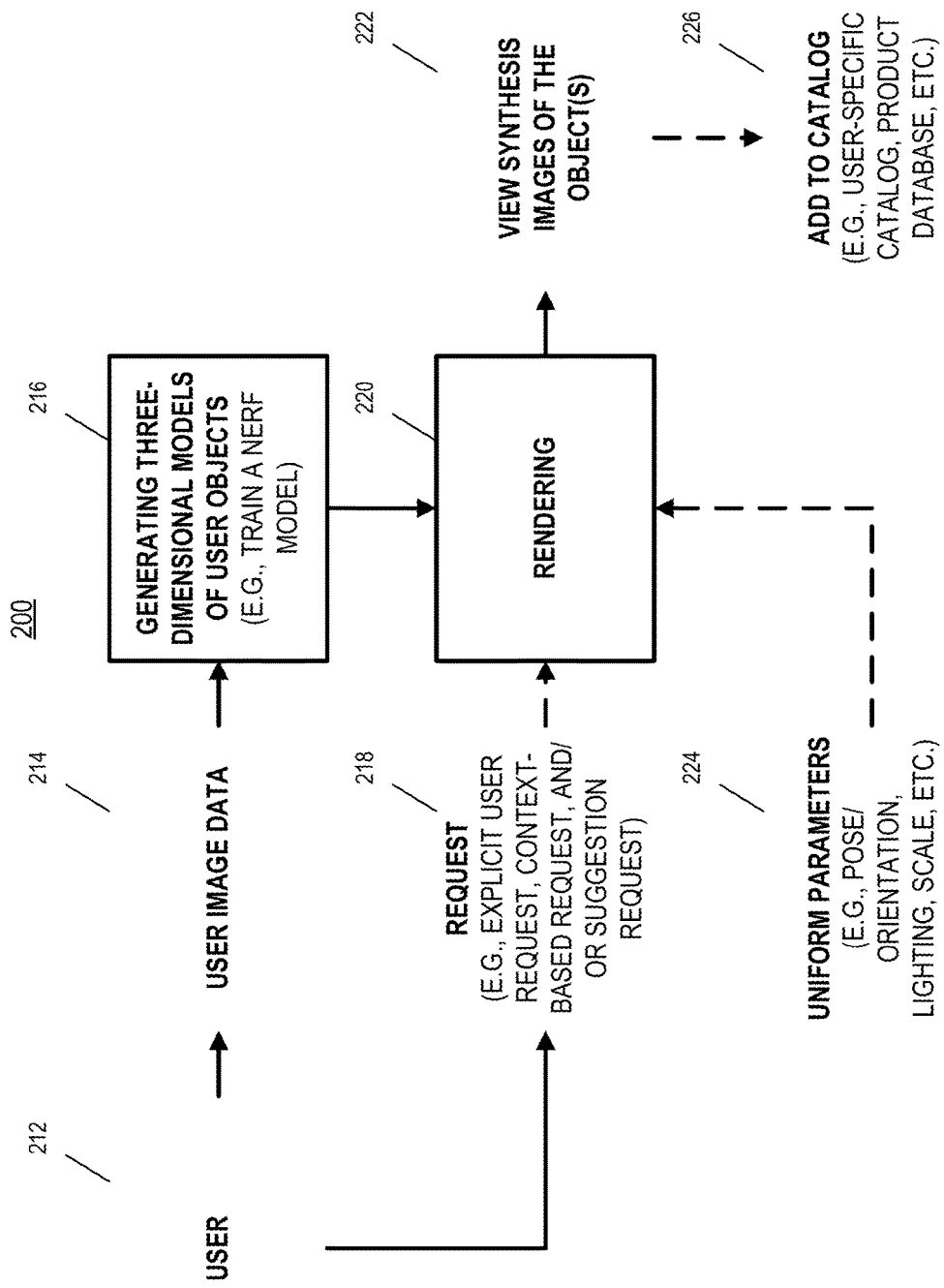
FIG. 2 depicts a block diagram of an example virtual object collection generation according to example embodiments of the present disclosure.

FIG. 2 depicts a block diagram of an example virtual object collection generation 200 according to example embodiments of the present disclosure. In particular, the virtual object collection generation 200 can include obtaining user image data 214 (e.g., images from a user-specific image gallery which may be stored locally and/or on a server computing system) and/or request data 218 (e.g., a manual request, a context-based request, and/or application-initiated request) from a user 212 (e.g., from a user computing system, which may include a user computing device (e.g., a mobile computing device)). The user image data 214 and/or the request data 218 can be obtained in response to a time event (e.g., a given interval for updating a virtual object catalog by combing through a user-specific image database), one or more user inputs (e.g., one or more inputs to a user interface to learn a three-dimensional representation for a specific object in an environment and/or one or more user inputs to import or export images from a user-specific storage), an application download and profile setup (e.g., a virtual closet application and/or an object modeling application), and/or a trigger event determination (e.g., a user location, a search query obtainment, and/or a knowledge trigger event). The user 212 can be an individual, a retailer, a manufacturer, a service provider, and/or another entity.

The user image data 214 can include images generated and/or obtained by a user 212 (e.g., via an image capture device (e.g., a camera of a mobile computing device)). Alternatively and/or additionally, user image data 214 can include user-selected data. For example, the user-selected data can include one or more images and/or image datasets selected by a user via one or more user inputs. The user-selected data may include images from a web page, image data posted on a social media platform, images in a user's "camera roll", image data locally stored in an image folder, and/or data stored in one or more other databases. The user-selected data may be selected via one or more user inputs, which can include a gesture input, a tap input, a cursor input, a text input, and/or any other form of input. The user image data 214 may be locally stored and/or stored on one or more server computing systems. The user image data 214 may be specifically associated with the particular user and/or may be shared data (e.g., shared between a set group and/or shared via a network and/or a web page) selected by the user to generate a virtual object that can then be stored in a collection and/or provided for display. The user image data 214 may include automatically selected image data. The automatic selection may be based on one or more object detections, one or more object classifications, and/or one or more image classifications. For example, a plurality of image datasets may be processed to determine a subset of image datasets that include image data descriptive of one or more objects of a particular object type. The subset may be selected for processing.

The user image data 214 can be utilized to generate three-dimensional models of user objects 216 (e.g., learning a three-dimensional representation of color values and density values of user objects by training the parameter of a neural radiance field model) depicted in the user image data 216. Generating the three-dimensional models 216 can include learning a three-dimensional representation of the respective objects by training one or more neural radiance field models on the user image data 214.

A rendering block 220 (e.g., one or more layers for prompting one or more neural radiance field models and/or one or more application programming interfaces for obtaining and/or utilizing neural radiance field models) can process the request data 218 and can utilize the generated three-dimensional models to render one or more view synthesis images of the object(s) 222. The request data 218 can be descriptive of an explicit user request to generate a view synthesis rendering in a user's environment (e.g., an augmented-reality rendering) and/or a user request to render the one or more objects in combination with one or more additional objects or features. The request data 218 may be descriptive of a context and/or parameters that may affect how the object is rendered (e.g., lighting, size of environmental objects, time of day, position and direction of other objects in the environment, and/or other contexts associated with the generation). The request data 218 may be generated and/or obtained in response to a context of the user.

The view synthesis images of the objects 222 can be provided via a view finder, a static image, a catalog user interface, and/or via a virtual reality experience. The generated view synthesis images 222 may be stored locally and/or on a server in association with a user profile.

In some implementations, the view synthesis images 222 may be rendered by the rendering block 220 based on one or more uniform parameters 224. The uniform parameters 224 can include a uniform pose (facing a particular direction (e.g., front facing)), a uniform position (e.g., an object centered in the image), uniform lighting (e.g., without shadows, front lit, natural lit, etc.), and/or uniform scale (e.g., the objects rendered may be scaled based on uniform scaling such that the renderings may have a uniform one inch to two pixel scale). The uniform parameters 224 can be utilized to provide cohesive rendering of objects, which can provide more informed comparison of objects and/or more informed cohesion comparison.

Additionally and/or alternatively, the one or more view synthesis images 22 can be added to a catalog 226. For example, the one or more view synthesis images 222 can be descriptive of one or more clothing objects and may be added to a virtual closet catalog. The virtual closet catalog can include a plurality of user clothing renderings, which can be utilized for outfit planning, for clothing shopping, and/or for clothing comparison. The catalog 226 may be a user-specific catalog, a product database for a retailer and/or manufacturer, and/or a group-specific catalog for group sharing. In some implementations, the generated catalog may be processed to determine object suggestions to a user and/or to a group of users. For example, a user preference, style, and/or deficiencies may be determined based on the depictions in a user-specific catalog. The wear and tear on clothing, a color palette, a style, an amount of specific object type, and/or an object collection may be determined and utilized to determine suggestions to provide to a user. The systems and methods may provide a specific object selection based on the existing object having a high level of wear and tear. Additionally and/or alternatively, a style of a user may be determined and suggestions for other objects of that style may be suggested.

Figure 3:
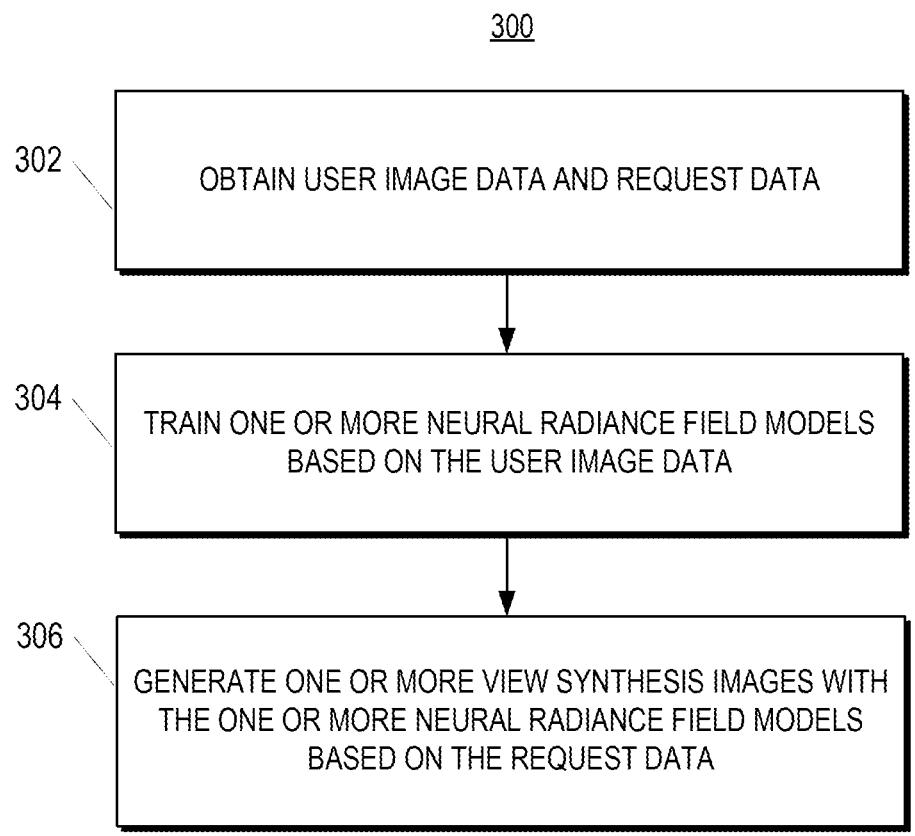
FIG. 3 depicts a flow chart diagram of an example method to perform view synthesis image generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain user image data and request data. The user image data can be descriptive of one or more images including one or more user objects. The one or more images may have been generated with a user computing device. Alternatively and/or additionally, the user image data can include user-selected data (e.g., one or more images obtained from a web page and/or web platform to be utilized to generate a virtual object). In some implementations, the request data can be descriptive of a request to generate an object type-specific collection. The request data can be associated with a context. In some implementations, the context can be descriptive of at least one of an object context or an environment context.

At 304, the computing system can train one or more neural radiance field models based on the user image data. The one or more neural radiance field models may be trained to generate a view synthesis of the one or more objects. The one or more neural radiance field models can be configured to predict color values and/or density values associated with an object to generate a view synthesis rendering of an image, which can include a view rendering of the object from a novel view not depicted in the user image data.

In some implementations, the computing system can process the user image data to determine the one or more objects are a particular object type and store the one or more neural radiance field models in a collection database. The collection database can be associated with the object type-specific collection. The particular object type may be associated with one or more articles of clothing.

At 306, the computing system can generate one or more view synthesis images with the one or more neural radiance field models based on the request data. The one or more view synthesis images can include one or more renderings of the one or more objects.

In some implementations, the one or more view synthesis images can be generated by processing a position and view direction with the one or more neural radiance field models to generate one or more predicted density values and one or more color values and generating the one or more view synthesis images based on the one or more predicted density values and the one or more color values.

In some implementations, the request data can be descriptive of one or more adjustment settings. Generating the one or more view synthesis images with the one or more neural radiance field models based on the request data can include adjusting one or more color values of a set of predicted values generated by the one or more neural radiance field models.

Additionally and/or alternatively, the request data can be descriptive of a particular position and a particular view direction. Generating the one or more view synthesis images with the one or more neural radiance field models based on the request data can include processing the particular position and the particular view direction with the one or more neural radiance field models to generate a view rendering of the one or more objects descriptive of a view associated with the particular position and the particular view direction.

In some implementations, the computing system can provide the one or more view synthesis images to a user computing system for display. For example, the view synthesis renderings can be provided for display via one or more user interfaces and may include a grid view, a carousel view, a thumbnail view, and/or an expanded view.

Additionally and/or alternatively, the computing system can provide a virtual object user interface to a user computing system. The virtual object user interface can provide the one or more view synthesis images for display. The one or more objects can be isolated from an original environment depicted in the user image data.

In some implementations, the computing system can obtain a plurality of additional user image datasets. Each of the plurality of additional user image datasets may have been generated with the user computing device. The computing system can process each of the plurality of additional user image datasets with one or more object determination models to determine a subset of the plurality of additional user image datasets comprise a respective object of the particular object type. The computing system can train a respective additional neural radiance field model for each respective additional user image dataset of the subset of the plurality of additional user image datasets and store each respective additional neural radiance field model in the collection database.

Figure 4:
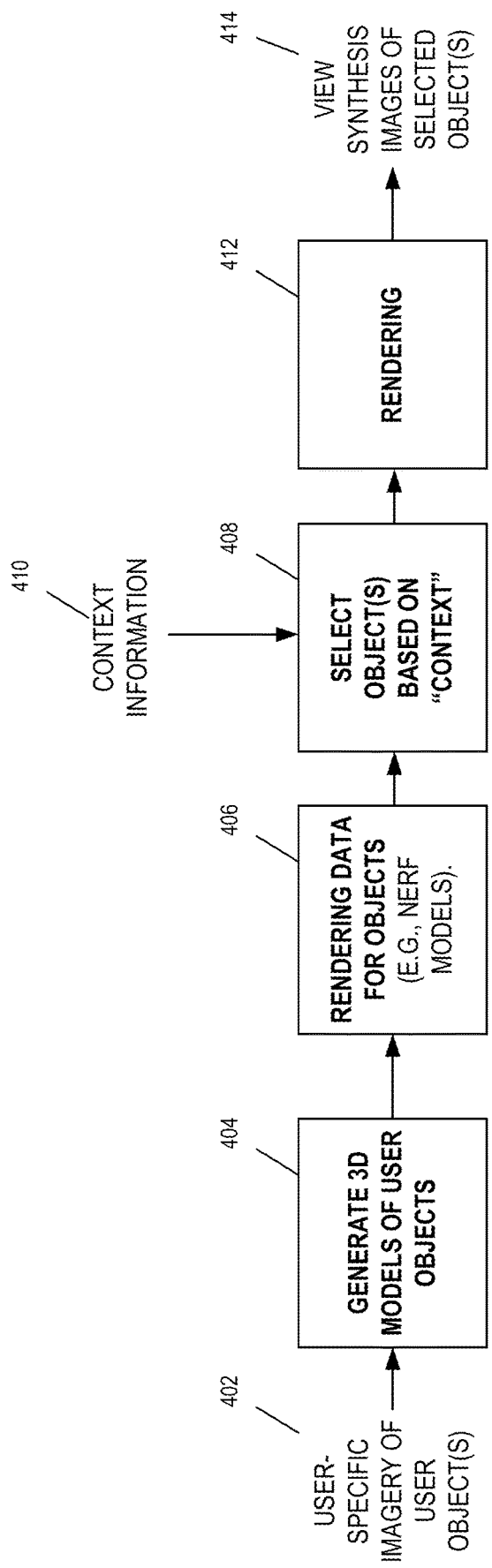
FIG. 4 depicts a block diagram of an example view synthesis image generation according to example embodiments of the present disclosure.

FIG. 4 depicts a block diagram of an example view synthesis image generation 400 according to example embodiments of the present disclosure. The view synthesis image generation 400 can include obtaining user-specific imagery of user objects 402 (e.g., one or more images of the object captured by a user computing device). In some implementations, a specific user interface may be utilized to instruct a user how to capture imagery to be utilized for training a neural radiance field model. Additionally and/or alternatively, a user interface and/or one or more applications can be utilized to capture an array of images of an object to be utilized to train one or more neural radiance field models to generate view renderings of one or more objects. Alternatively and/or additionally, the user-specific imagery of user objects 402 may be obtained from a user-specific image database (e.g., an image gallery associated with a user).

The user-specific imagery of user object(s) 402 can be utilized to generate three-dimensional models of user objects 404 (e.g., the user-specific imagery of user object(s) 402 can be utilized to train one or more neural radiance field models to learn one or more three-dimensional representations of the object(s)). The generated three-dimensional models can be utilized to generate rendering data for objects 406 (e.g., trained neural radiance field models and/or parameter data). The rendering data may be stored in association with object-specific data, which may include classification data (e.g., object labels), source image data, metadata, and/or user annotations.

The stored rendering data may then be selected 408 based on context information 410. For example, the rendering data may be selected 408 based on context information 410 that may include a user search history, a user search query, a budget, other selected objects, a user location, a time, and/or an aesthetic associated with a current environment of a user.

The selected rendering data can then be processed by a rendering block 412 to render one or more view synthesis images of selected object(s) 414. In some implementations, a plurality of rendering datasets associated with a plurality of different user objects may be obtained to render one or more images with a plurality of user objects. Additionally and/or alternatively, the user objects may be rendered into a user environment, a template environment, and/or a user selected environment. The one or more user objects may be rendered adjacent to suggested objects (e.g., suggested items to purchase).

Figure 5:
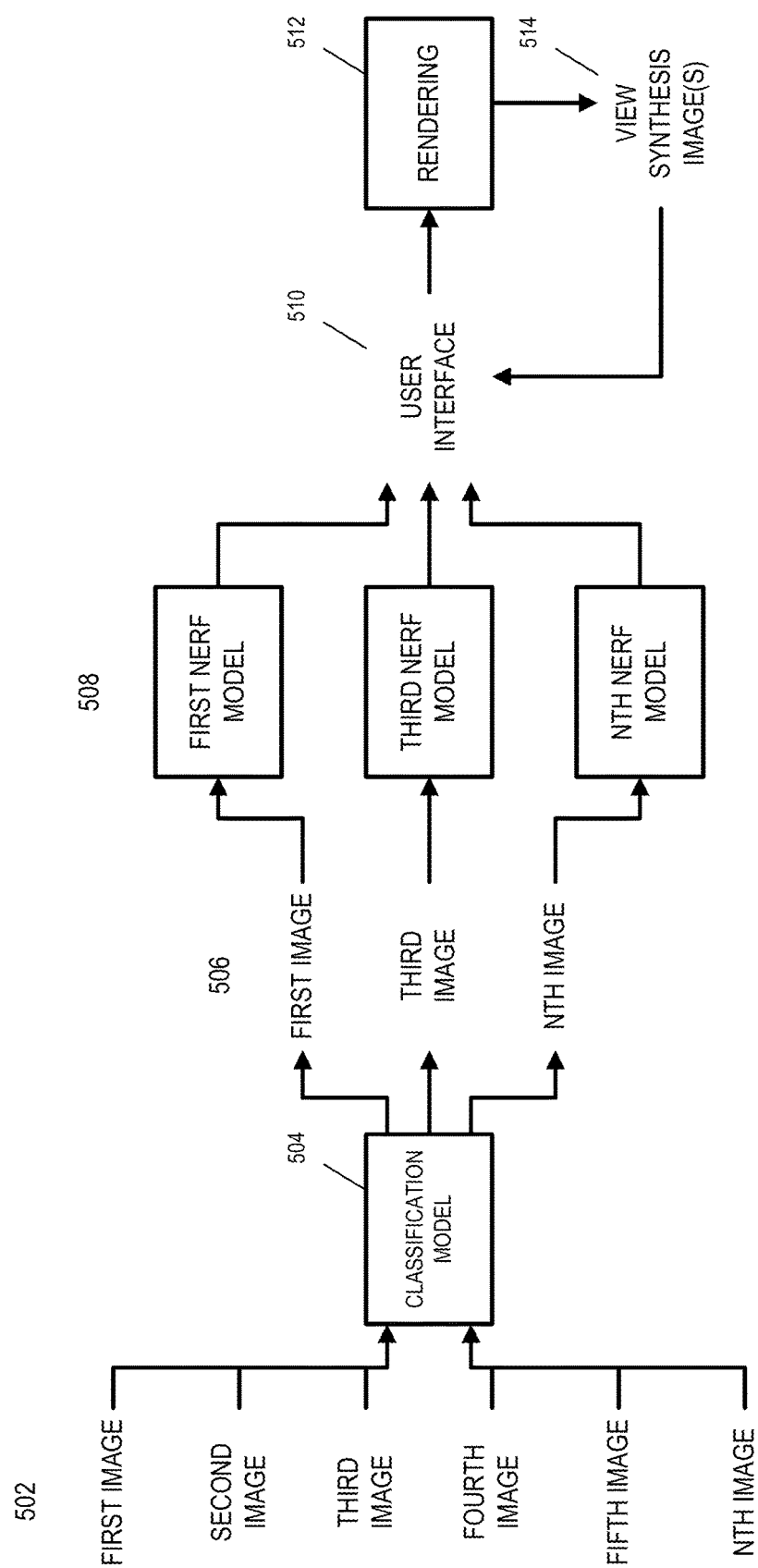
FIG. 5 depicts a block diagram of an example neural radiance field model training and utilization according to example embodiments of the present disclosure.

FIG. 5 depicts a block diagram of an example neural radiance field model training and utilization 500 according to example embodiments of the present disclosure. In particular, a plurality of images 502 can be obtained. The plurality of images 502 can include a first image, a second image, a third image, a fourth image, a fifth image, and/or an nth image. The plurality of images 502 can be obtained from a user-specific database (e.g., local storage and/or cloud storage associated with a user). In some implementations, the plurality of images 502 may be obtained via a capture device associated with a user computing system.

The plurality of images 502 can be processed with one or more classification models 504 (and/or one or more detection models and/or one or more segmentation models) to determine a subset of images 506 that include one or more objects associated with one or more object types. For example, the classification model 504 may determine the subset of images 506 include objects of a particular object type (e.g., a clothing object type, a furniture object type, and/or a specific product type). The subset of images 506 can include the first image, the third image, and the nth image. The different images of the subset of images 506 may be descriptive of different objects. In some implementations, images descriptive of the same object may be determined and utilized to generate an object-specific dataset for refined training.

The subset of images 506 can then be utilized to train a plurality of neural radiance field models 508 (e.g., a first NeRF model associated with an object (e.g., a first object) of the first image, a third NeRF model associated with an object (e.g., a third object) of the third image, and an nth NeRF model associated with an object (e.g., an nth object) of the nth image). Each neural radiance field model may be trained to generate view synthesis renderings of different objects. The different neural radiance field datasets (e.g., the neural radiance field models 508 and/or learned parameters) may be stored.

A user may then interact with a user interface 510. Based on the user interface interactions, one or more of the neural radiance field datasets may be obtained. The one or more selected neural radiance field datasets may be utilized by a rendering block 512 to generate one or more view synthesis image(s) 514 descriptive of one or more user objects.

One or more additional user interface interactions may be received, which may prompt the rendering of additional view synthesis renderings based on one or more adjustments associated with one or more inputs.

Figure 6:
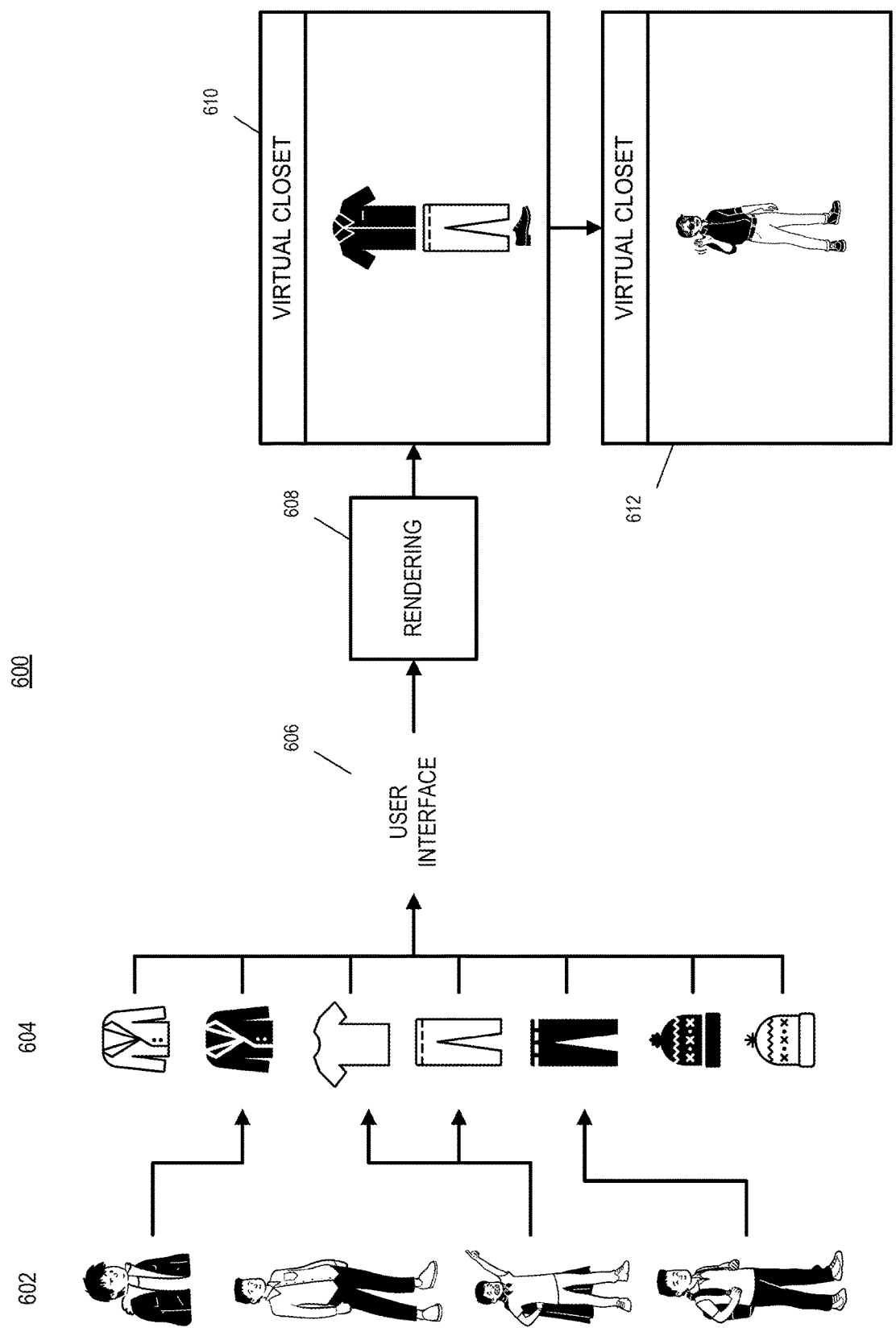
FIG. 6 depicts an illustration of an example virtual closet interface according to example embodiments of the present disclosure.

FIG. 6 depicts an illustration of an example virtual closet interface 600 according to example embodiments of the present disclosure. In particular, a plurality of images 602 can be obtained and/or processed to generate a plurality of rendering datasets 604 associated with clothing depicted in the plurality of images 602. The plurality of images 602 can be obtained from user-specific databases (e.g., local storage and/or cloud storage associated with the user). In some implementations, one or more images of the plurality of images 602 and/or one or more rendering datasets of the plurality of rendering datasets 604 may be obtained from a database associated with one or more other users (e.g., a rendering dataset associated with a retailer and/or a manufacturer selling a product (e.g., a dress or shirt)).

The plurality of rendering datasets 604 can be selected and/or accessed in response to one or more interactions with a user interface 606. One or more rendering datasets can be selected and processed by a rendering block 608 to generate one or more view synthesis renderings. For example, the systems and methods may be utilized to formulate an outfit to wear. A user may select and/or may be suggested an outfit that may be rendered with cohesive posing and lighting for review. The generated rendering may include a virtual closet rendering segmented from a user 610 and/or rendered on a user 612 or a template individual. In some implementations, the user can scroll through view synthesis renderings of different articles of clothing, can determine an outfit to visualize on the particular user (e.g., augmented-reality try-on and/or a template image of the user or another individual), and can render the selected outfit on the user.

In some implementations, each clothing sub-type can include a plurality of view synthesis renderings associated with different objects of that clothing sub-type. A carousel interface may be provided for each clothing sub-type, and a plurality of carousel interfaces may be provided concurrently to scroll through each sub-type individually and/or in unison, which can allow cohesive outfits. A user may then select a try-on rendering user interface element to then render the selected outfit on the user and/or a template individual.

A similar user interface may be implemented for interior design, landscaping, and/or game design. The virtual closet interface and/or the other similar user interfaces may include one or more suggestions determined based on user objects, user search history, user browsing history, and/or user preferences. The rendering datasets of the suggestions may be obtained from a server database. The server database may include rendering datasets generated by other users (e.g., retailers, manufacturers, and/or peer-to-peer sellers). The suggestions may be based on availability to the specific user, size, and/or price range.

Figure 7:
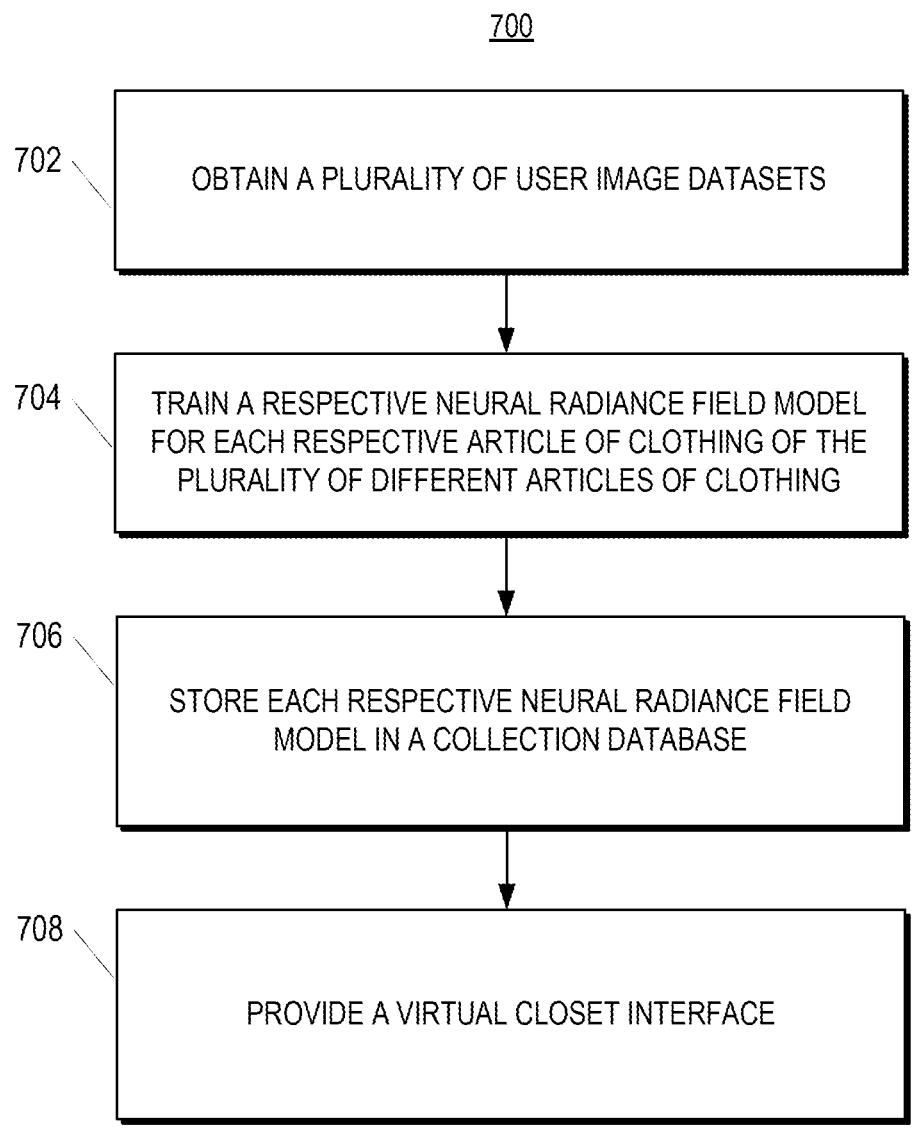
FIG. 7 depicts a flow chart diagram of an example method to perform virtual closet generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a plurality of user images. Each of the plurality of user images can include one or more articles of clothing. The plurality of user images can be associated with a plurality of different articles of clothing. In some implementations, the plurality of user images may be automatically obtained from a storage database associated with a particular user based on obtained request data. Additionally and/or alternatively, the plurality of user images may be selected from a corpus of user images based on metadata, one or more user inputs, and/or one or more classifications.

In some implementations, the computing system can access a storage database associated with a user and process a corpus of user images with one or more classification models to determine the plurality of user images that comprise one or more objects classified as clothing.

At 704, the computing system can train a respective neural radiance field model for each respective article of clothing of the plurality of different articles of clothing. Each respective neural radiance field model can be trained to generate one or more view synthesis renderings of a particular respective article of clothing.

At 706, the computing system can store each respective neural radiance field model in a collection database. The collection database may be associated with an object type (e.g., clothing, furniture, plants, etc.) and/or an object sub-type (e.g., pants, shirts, shoes, tables, lamps, chairs, lilies, orchids, bushes, etc.). The collection database may be associated with a specific user and/or a specific marketplace. A user may supplement the collection database with products discovered via one or more online marketplaces, social media posts from social media platforms, and/or suggested rendering datasets associated with suggested objects (or products). The suggestions may be based on a determined user need, a determined user style, a determined user aesthetic, and/or a user context. The suggested products may be associated with a known size, a known availability, and/or a known price compatibility.

At 708, the computing system can provide a virtual closet interface. The virtual closet interface can provide a plurality of clothing view synthesis renderings for display based on the plurality of respective neural radiance field models. The plurality of clothing view synthesis renderings can be associated with at least a subset of the plurality of different articles of clothing. In some implementations, the virtual closet interface can include one or more interface features to view a clothing ensemble including two or more articles of clothing displayed simultaneously. The plurality of clothing view synthesis renderings can be generated based on one or more uniform pose parameters and one or more uniform lighting parameters.

Figure 8:
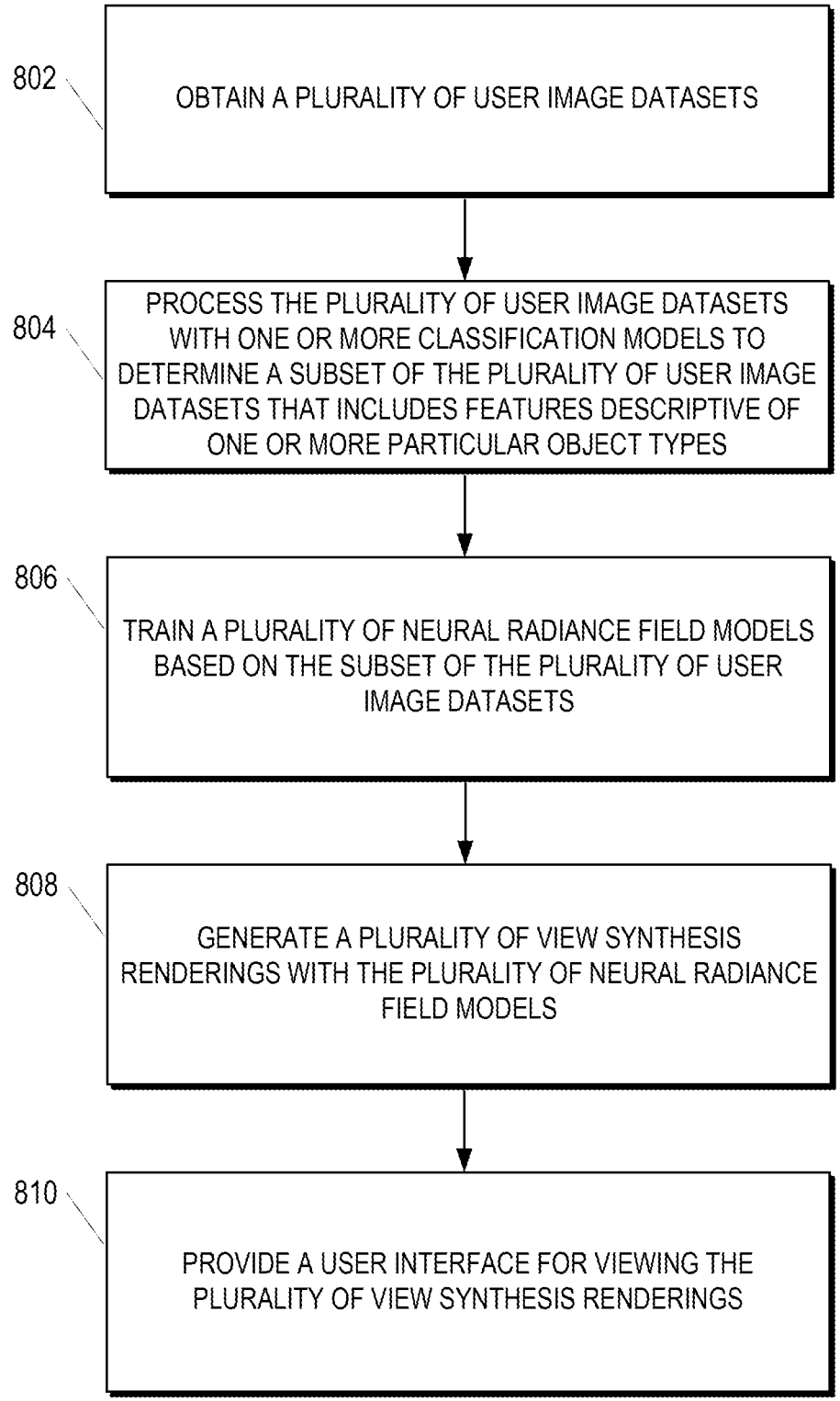
FIG. 8 depicts a flow chart diagram of an example method to perform virtual object user interface generation and display according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of user image datasets. Each user image dataset of the plurality of user image datasets can be descriptive of one or more images including one or more objects. The one or more images may have been generated with a user computing device (e.g., a mobile computing device with an image capture component). The capture and/or generation of the user image datasets can be facilitated by one or more user interface elements for capturing an array of images for each particular object.

At 804, the computing system can process the plurality of user image datasets with one or more classification models to determine a subset of the plurality of user image datasets that includes features descriptive of one or more particular object types. In some implementations, the determination may include one or more additional machine-learned models (e.g., one or more detection models, one or more segmentation models, and/or one or more feature extractors). The one or more classification models may have been trained to classify one or more specific object types (e.g., a clothing type, a furniture type, etc.). The one or more classified objects may be segmented to generate a plurality of segmented images.

At 806, the computing system can train a plurality of neural radiance field models based on the subset of the plurality of user image datasets. Each respective neural radiance field model can be trained to generate a view synthesis of one or more particular objects of a respective user image dataset of the subset of the plurality of user image datasets. In some implementations, the subset may be processed to generate a plurality of training patches associated with each particular user image dataset of the subset. The patches may be utilized for training the neural radiance field model(s).

In some implementations, the computing system can determine a first set of user image datasets including features descriptive of a first object sub-type. The computing system can associate a respective first set of neural radiance models with a first object sub-type label, can determine a second set of user image datasets including features descriptive of a second object sub-type, and can associate a respective second set of neural radiance models with a second object sub-type label.

At 808, the computing system can generate a plurality of view synthesis renderings with the plurality of neural radiance field models. The plurality of view synthesis renderings can be descriptive of a plurality of different objects (e.g., different articles of clothing) of the particular object type (e.g., a clothing object type and/or a furniture object type).

At 810, the computing system can provide a user interface for viewing the plurality of view synthesis renderings. The user interface can include a rendering pane for viewing the plurality of view synthesis renderings. The plurality of view synthesis renderings may be provided via a carousel interface, a plurality of thumbnails, and/or a compiled rendering with a plurality of objects displayed in a singular environment.

In some implementations, the computing system can receive an ensemble rendering request. The ensemble rendering request can be descriptive of a request to generate a view rendering of a first object of the first object sub-type and a second object of the second object sub-type. The computing system can generate an ensemble view rendering with a first neural radiance field model of the respective first set of neural radiance field models and a second neural radiance field model of the respective second set of neural radiance field models. The ensemble view rendering can include image data descriptive of the first object and the second object in a shared environment.

In some implementations, the one or more neural radiance field models can be utilized to generate an augmented-reality asset and/or a virtual-reality experience. For example, the one or more neural radiance field models can be utilized to generate a plurality of view synthesis renderings of one or more objects and/or environments that can be utilized to provide an augmented-reality experience and/or a virtual-reality experience to a user. The augmented-reality experience can be utilized to view the object (e.g., the user object) in different places and/or positions in an environment the user is currently in, which may be an environment that differs from the environment the current physical object resides. The virtual-reality experience can be utilized to provide a virtual walk-through experience, which can be utilized for remodeling, virtual visiting (e.g., virtually visit a haunted house or an escape room), apartment previews, and/or social media sharing of an environment that a user can share to have friends and/or family view the environment. Additionally and/or alternatively, the view synthesis renderings can be utilized for video game development and/or other content generation.

Figure 9A:
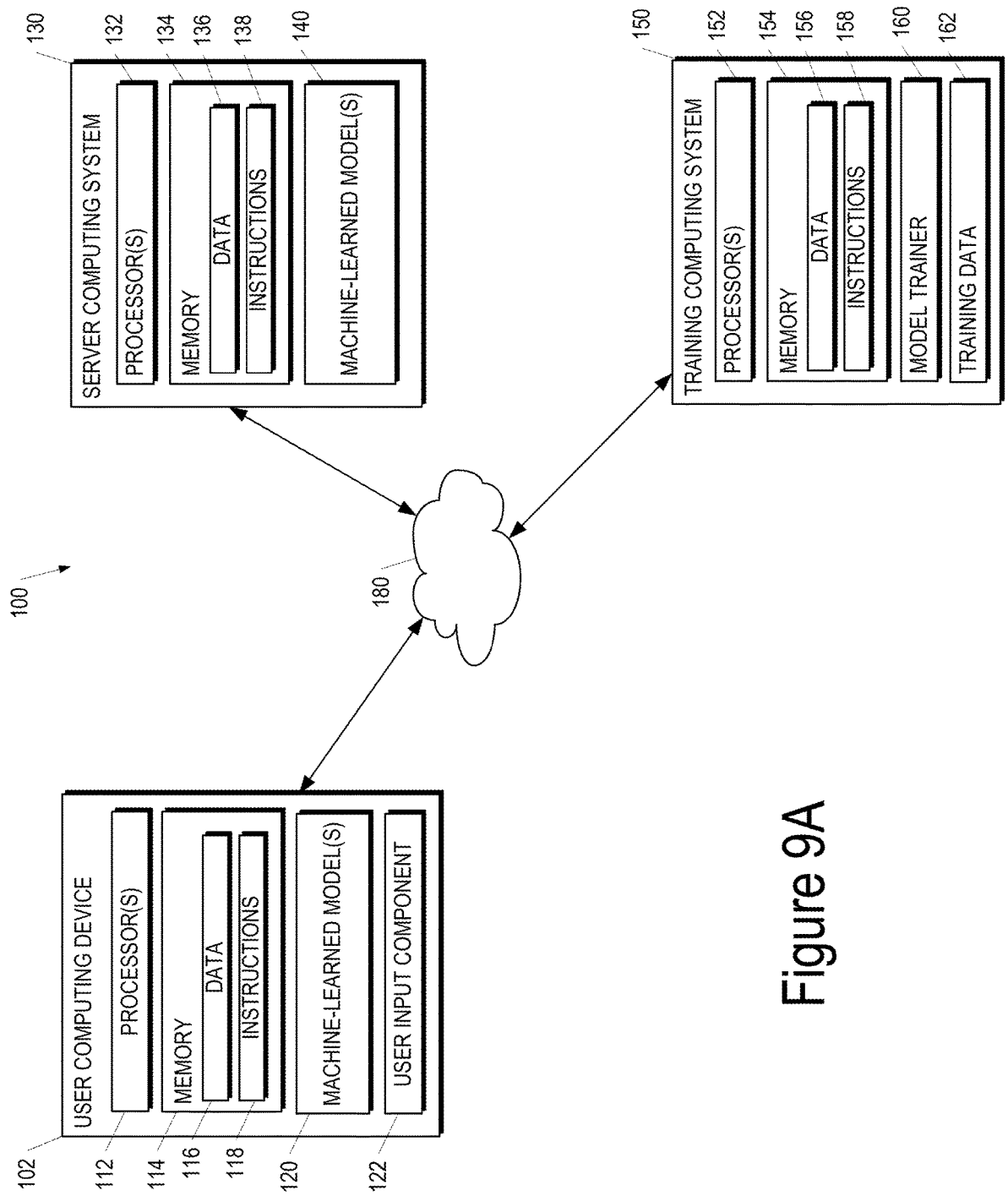
FIG. 9A depicts a block diagram of an example computing system that performs view synthesis image generation according to example embodiments of the present disclosure.

FIG. 9A depicts a block diagram of an example computing system 100 that performs view synthesis image generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural radiance field models 120. For example, the neural radiance field models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example neural radiance field models 120 are discussed with reference to FIGS. 1-2 & 4-6.

In some implementations, the one or more neural radiance field models 120 can be received from the server computing system 130 over network 180, stored in the user computing device memory 114, and then used or otherwise implemented by the one or more processors 112. In some implementations, the user computing device 102 can implement multiple parallel instances of a single neural radiance field model 120 (e.g., to perform parallel user object three-dimensional modeling across multiple instances of objects in user images).

More particularly, the neural radiance field models 120 can be configured to process a three-dimensional position and a two-dimensional view direction to determine one or more predicted color values and one or more predicted density values to generate a view synthesis of one or more objects from the position and view direction. A specific neural radiance field model may be associated with one or more labels. The specific neural radiance field model can be obtained based on the association with a given label and/or a given object. The neural radiance field models 120 can be utilized for synthesizing images with a plurality of objects, for viewing objects virtually, and/or for augmented-reality rendering.

Additionally or alternatively, one or more neural radiance field models 140 can be included in or otherwise stored and implemented by the server computing system 130 that communicates with the user computing device 102 according to a client-server relationship. For example, the neural radiance field models 140 can be implemented by the server computing system 140 as a portion of a web service (e.g., a view synthesis image generation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural radiance field models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-2 & 4-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the neural radiance field models 120 and/or 140 based on a set of training data 162. The training data 162 can include, for example, user images, metadata, additional training images, ground truth labels, example training renderings, example feature annotations, example anchors, and/or training video data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 9A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 9B:
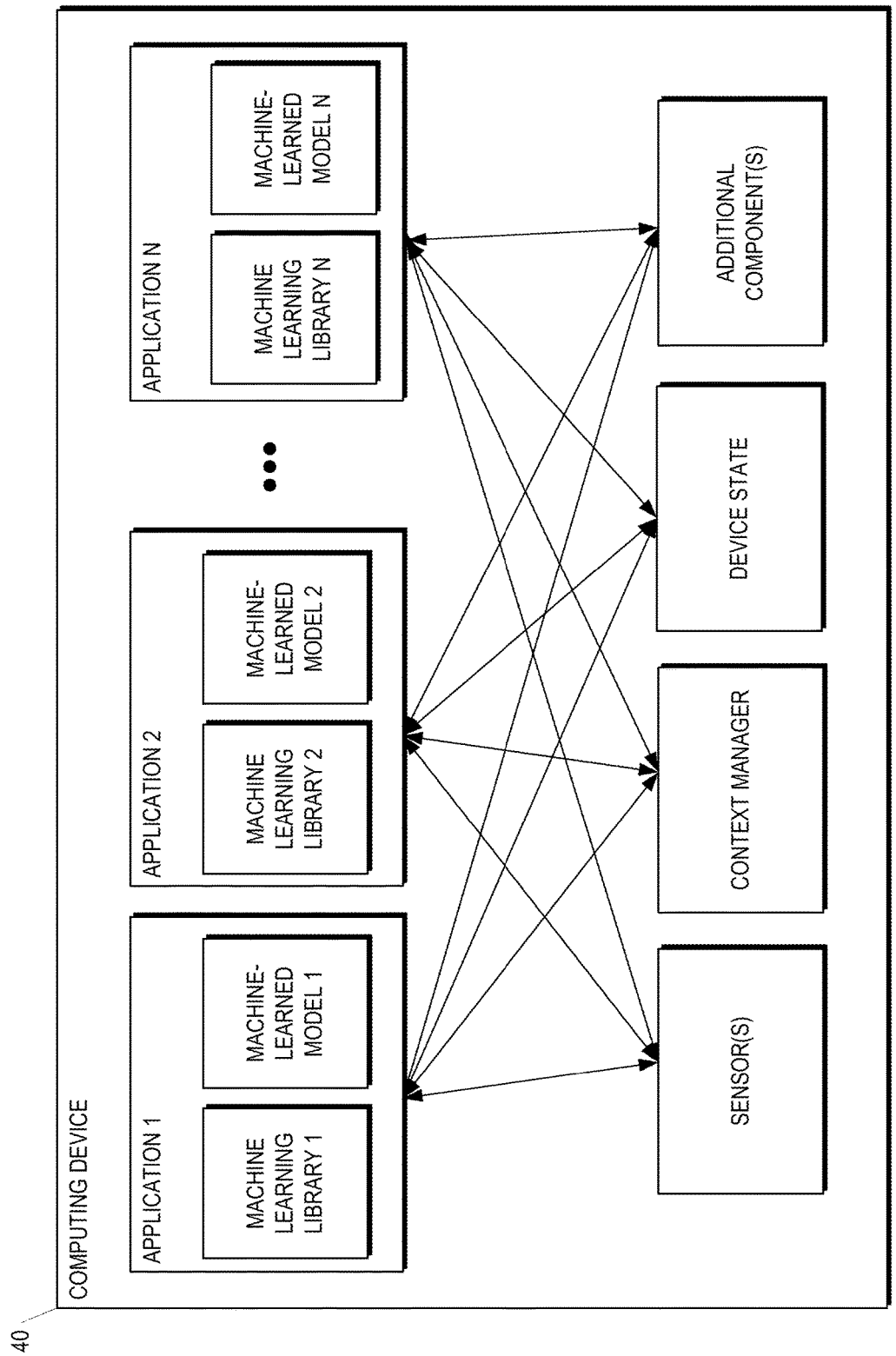
FIG. 9B depicts a block diagram of an example computing device that performs view synthesis image generation according to example embodiments of the present disclosure.

FIG. 9B depicts a block diagram of an example computing device 40 that performs according to example embodiments of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
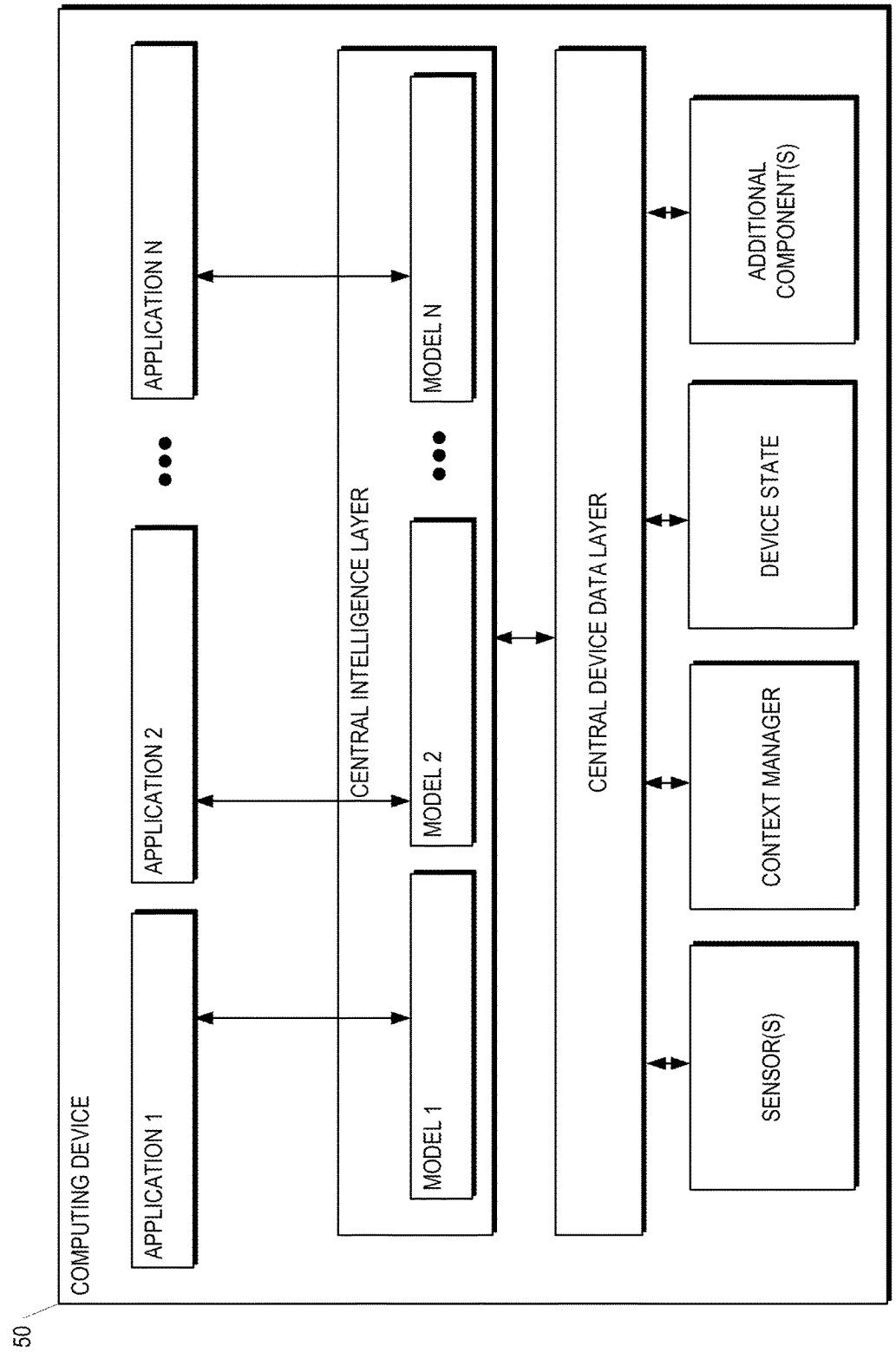
FIG. 9C depicts a block diagram of an example computing device that performs view synthesis image generation according to example embodiments of the present disclosure.

FIG. 9C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 10:
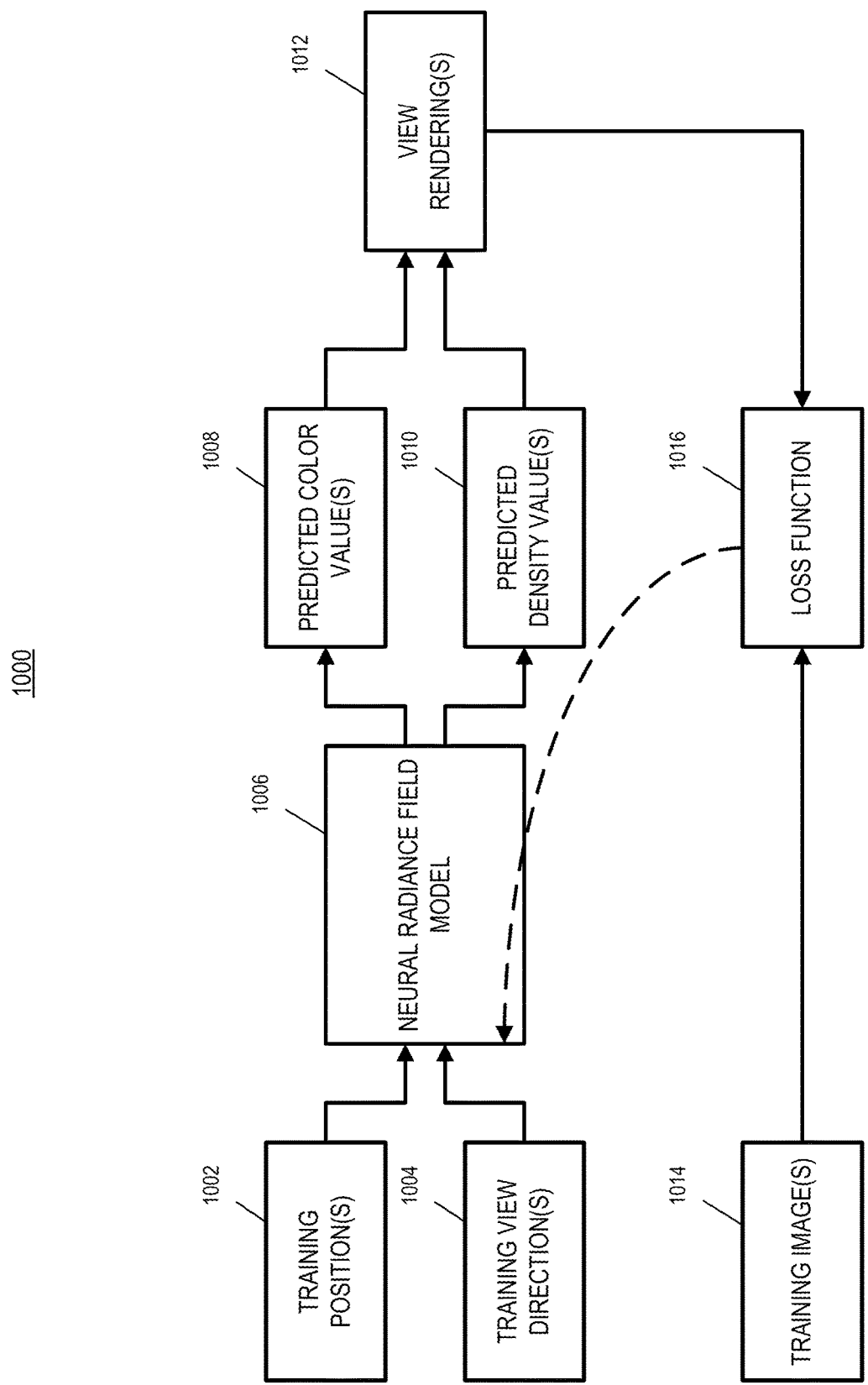
FIG. 10 depicts a block diagram of an example neural radiance field model training according to example embodiments of the present disclosure.

FIG. 10 depicts a block diagram of an example neural radiance field model training 1000 according to example embodiments of the present disclosure. Training the neural radiance field model 1006 can include processing one or more training datasets. The one or more training datasets can be specific to one or more objects and/or one or more environments. For example, a neural radiance field model 1006 can process a training position 1002 (e.g., a three-dimensional position) and a training view direction 1004 (e.g., a two-dimensional view direction and/or a vector) to generate one or more predicted color values 1008 and/or one or more predicted density values 1010. The one or more predicted color values 1008 and the one or more predicted density values 1010 can be utilized to generate a view rendering 1012.

A training image 1014 associated with the training position 1002 and training view direction 1004 can be obtained. The training image 1014 and the view rendering 1012 can be utilized to evaluate a loss function 1016. The evaluation can then be utilized to adjust one or more parameters of the neural radiance field model 1006. For example, the training image 1014 and the view rendering 1012 can be utilized to evaluate the loss function 1016 to generate a gradient descent, which can be backpropagated to adjust the one or more parameters. The loss function 1016 can include an L2 loss function, a perceptual loss function, a mean-squared loss function, a cross-entropy loss function, and/or a hinge loss function.

In some implementations, the systems and methods disclosed herein can be utilized to generate and/or render augmented environments based on user image data, one or more neural radiance field models, meshes, and/or suggested datasets.

Figure 11:
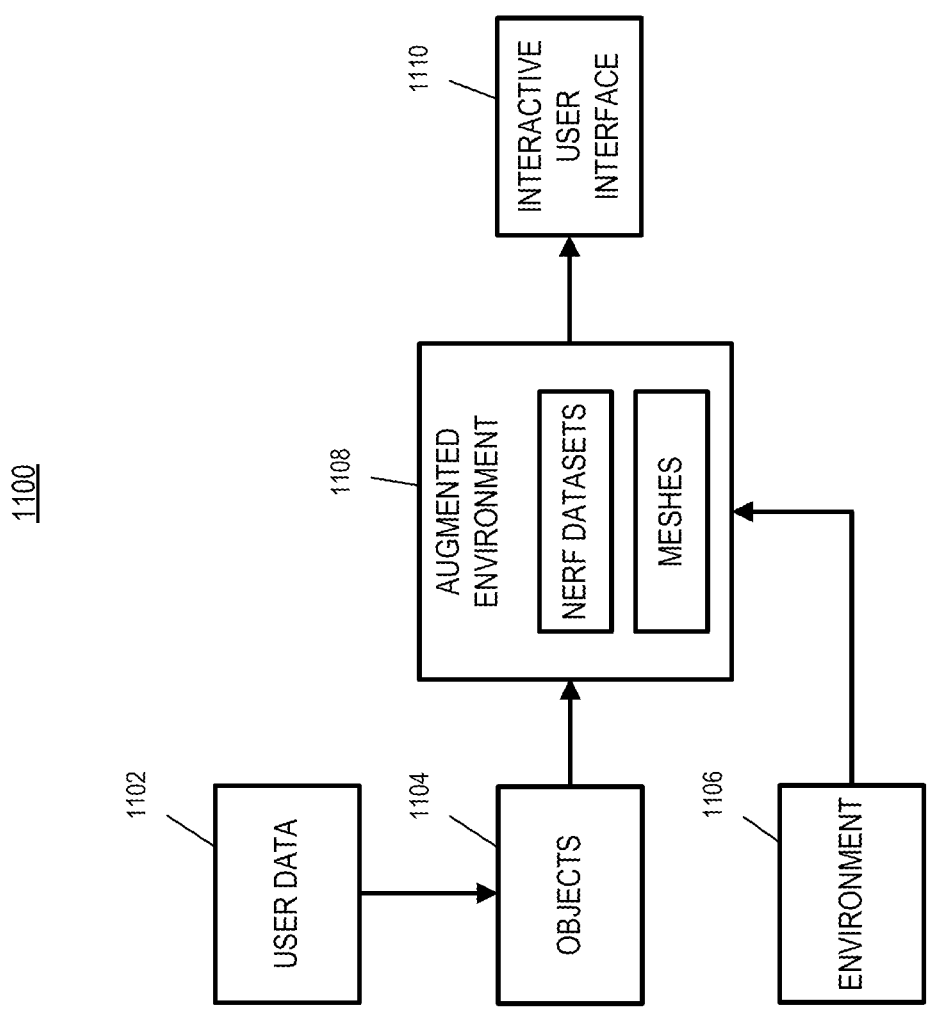
FIG. 11 depicts a block diagram of an example augmented environment generation system according to example embodiments of the present disclosure.

FIG. 11 depicts a block diagram of an example augmented environment generation system 1100 according to example embodiments of the present disclosure. The augmented environment generation system 1100. In particular, FIG. 11 depicts an augmented environment generation system 1100 that includes obtaining user data 1102 (e.g., a search query, search parameters, preference data, historical user data, user-selected data, and/or image data) and outputting an interactive user interface 1110 to a user that is descriptive of a three-dimensional representation of an augmented environment 1108 that includes a plurality of objects 1104 rendered into an environment 1106.

For example, user data 1102 associated with a user can be obtained. The user data 102 can include a search query (e.g., one or more key words and/or one or more query images), historical data (e.g., a user's search history, a user's browser history, and/or a user's purchase history), preference data (e.g., explicitly input preferences, learned preferences, and/or a weighted adjustment of preferences), user-selected data, refinement parameters (e.g., a price range, a location, a brand, a rating, and/or a size), the user image data, and/or a generated collection (e.g., a collection generated by the user, which can include a shopping cart, a virtual object catalog, and/or a virtual interest board).

The user data 1102 can be utilized to determine one or more objects 1104. The one or more objects 1104 can be responsive to the user data 1102. For example, the one or more objects 1104 can be associated with search results responsive to a search query and/or one or more refinement parameters. In some implementations, the one or more objects 104 can be determined by processing the user data 1102 with one or more machine-learned models trained to suggest objects.

The one or more rendering datasets associated with the one or more objects 1104 can be obtained to augment an environment 1106 to generate an augmented environment 1108 that can be provided in an interactive user interface 1110. The one or more rendering datasets can include one or more meshes and one or more neural radiance field datasets (e.g., one or more neural radiance field models with one or more learned parameters associated with the object) for each particular object.

The augmented environment 1108 can be provided as meshes rendered in an environment 1106 during instances of environment navigation and can be provided with neural radiance field renderings in the environment 1106 during instances of a threshold time being obtained during viewing of the augmented environment 1108 from a particular position and view direction.

The navigation and stagnation can occur in response to interactions with the interactive user interface 1110. The interactive user interface 1110 can include pop-up elements for providing additional information on the one or more objects 1104 and/or may be utilized to replace/add/delete objects 1104.

The environment 1106 can be a template environment and/or may be a user environment generated based on one or more user inputs (e.g., virtual model generation and/or one or more input images).

Figure 12:
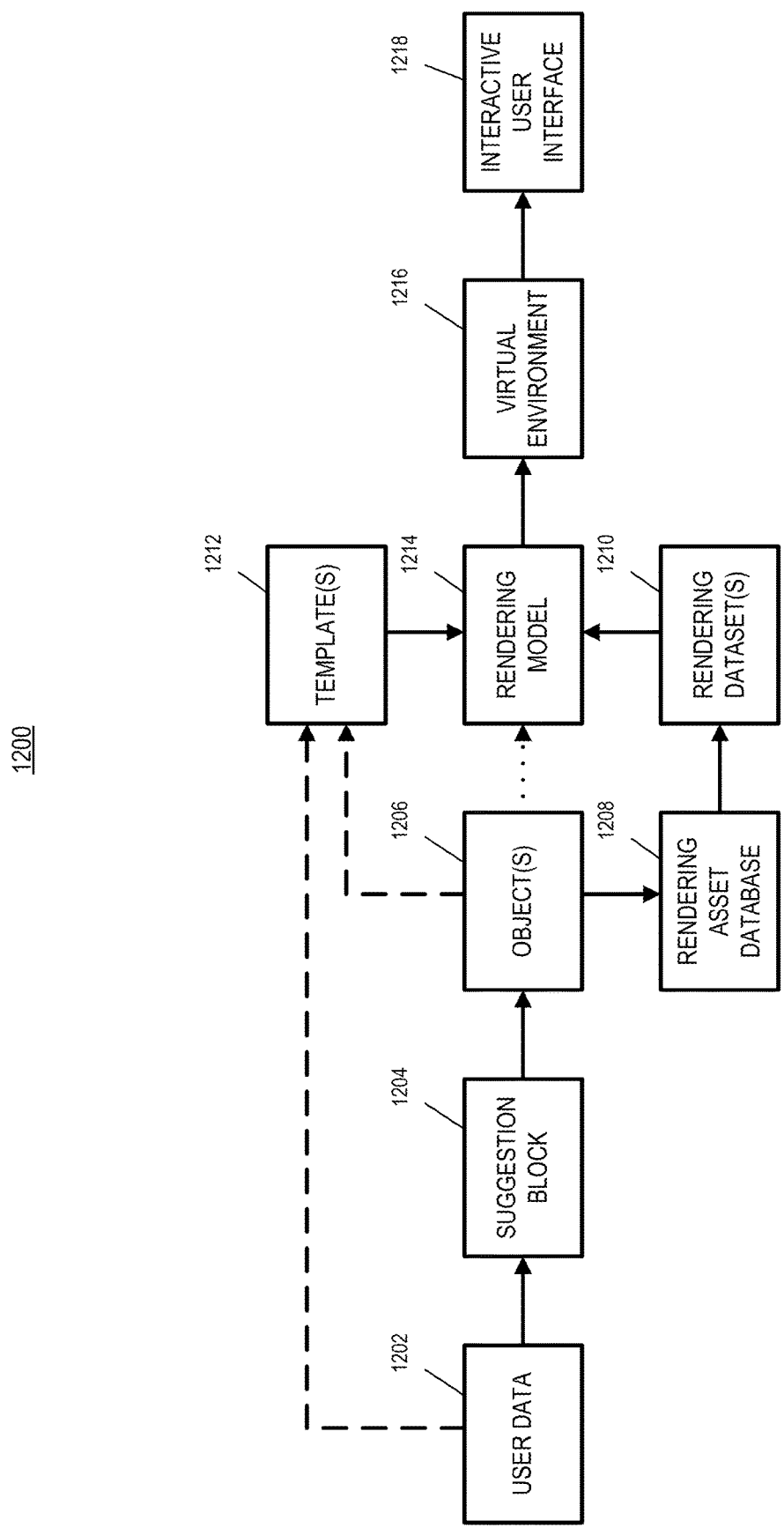
FIG. 12 depicts a block diagram of an example virtual environment generation according to example embodiments of the present disclosure.

FIG. 12 depicts a block diagram of an example virtual environment generation 1200 according to example embodiments of the present disclosure. In particular, FIG. 12 depicts user data 1202 being processed to generate a virtual environment 1216, which can be provided for display via an interactive user interface 1218.

The user data 1202 can be obtained from a user computing system. The user data 1202 can include a search query, historical data (e.g., search history, browsing history, purchase history, and/or interaction history), preference data, user-selected data, and/or user profile data. The user data 1202 can be processed by a suggestion block 1204 to determine one or more objects 1206 associated with the user data 1202. The one or more objects 1206 can be associated with one or more products for purchase. One or more rendering datasets 1210 can then be obtained from a rendering asset database 1208 based on the one or more objects 1206. The one or more rendering datasets 1210 can be obtained by querying the rendering asset database 208 with data associated with the one or more objects 1206. In some implementations, the one or more rendering datasets 1210 can be pre-associated with the one or more objects 1206 (e.g., via one or more labels).

One or more templates 1212 can then be obtained. The one or more templates 1212 can be associated with one or more example environments (e.g., an example room, an example lawn, and/or an example car). The one or more templates 1212 may be determined based on the user data 1202 and/or based on the one or more objects 1206. The templates 1212 can include image data, mesh data, a trained neural radiance field model, a three-dimensional representation, and/or a virtual-reality experience.

The one or more templates 1212 and the one or more rendering datasets 1210 can be processed with a rendering model 1214 to generate a virtual environment 1216. The rendering model 1214 can include one or more neural radiance field models (e.g., one or more neural radiance field models trained on other user datasets and/or one or more neural radiance field models trained on the user's image datasets), one or more augmentation models, and/or one or more mesh models.

The virtual environment 1216 can be descriptive of the one or more objects 1206 rendered into the template environment. The virtual environment 1216 can be generated based on the one or more templates 1212 and the one or more rendering datasets 1210. The virtual environment 1216 may be provided for display in an interactive user interface 1218. In some implementations, the user may be able to interact with interactive user interface 1218 to view the virtual environment 1216 from different angles and/or with different scaling.

Figure 13:
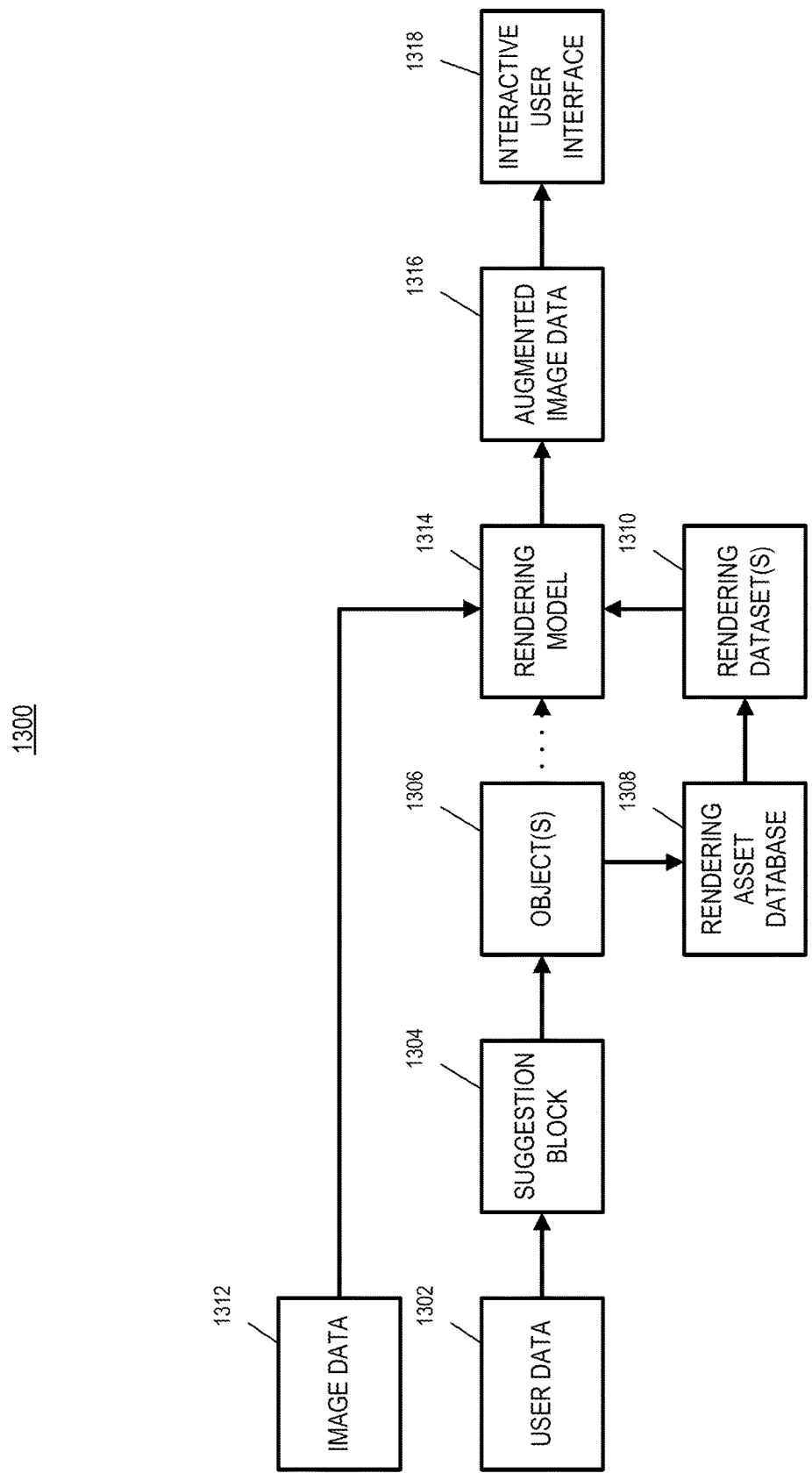
FIG. 13 depicts a block diagram of an example augmented image data generation according to example embodiments of the present disclosure.

FIG. 13 depicts a block diagram of an example augmented image data generation 1300 according to example embodiments of the present disclosure. In particular, FIG. 13 depicts user data 1302 and image data 1312 being processed to generate augmented image data 1316, which can be provided for display via an interactive user interface 1318.

The user data 1302 can be obtained from a user computing system. The user data 1302 can include a search query, historical data (e.g., search history, browsing history, purchase history, and/or interaction history), preference data, and/or user profile data. The user data 1302 can be processed by a suggestion block 1304 to determine one or more objects 306 associated with the user data 1302. The one or more objects 1306 can be associated with one or more products for purchase. One or more rendering datasets 1310 can then be obtained from a rendering asset database 1308 based on the one or more objects 1306. The one or more rendering datasets 1310 can be obtained by querying the rendering asset database 1308 with data associated with the one or more objects 1306. In some implementations, the one or more rendering datasets 1310 can be pre-associated with the one or more objects 1306 (e.g., via one or more labels).

Image data 1312 can then be obtained. The image data 1312 can be associated with one or more user environments (e.g., a living room of a user, a bedroom of the user, a current environment a user is in, a lawn of the user, and/or a specific car associated with the user). The image data 1312 may be obtained in response to one or more selections by a user. The image data 1312 can include one or more images of the environment. In some implementations, the image data 1312 can be utilized to train one or more machine-learned models (e.g., one or more neural radiance field models).

The image data 1312 and the one or more rendering datasets 1310 can be processed with a rendering model 1314 to generate augmented image data 1316. The rendering model 1314 can include one or more neural radiance field models, one or more augmentation models, and/or one or more mesh models.

The augmented image data 1316 can be descriptive of the one or more objects 1306 rendered into the user environment. The augmented image data 1316 can be generated based on the image data 1312 and the one or more rendering datasets 1310. The augmented image data 1316 may be provided for display in an interactive user interface 1318. In some implementations, the user may be able to interact with interactive user interface 1318 to view one or more various renderings of the augmented image data 1316 descriptive of different angles and/or different scaling for the augmented user environment.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
   one or more processors; and
   one or more non-transitory computer-readable media that collectively store instructions that, when executed by the one or more processors, cause the computing system to perform operations, the operations comprising:
      obtaining user image data and request data, wherein the user image data is descriptive of one or more images comprising one or more user objects, wherein the one or more images were generated with a user computing device, wherein the request data is descriptive of a request to generate an object type-specific collection;
      processing the user image data to determine the one or more objects are a particular object type;
      training one or more neural radiance field models based on the user image data, wherein the one or more neural radiance field models are trained to generate a view synthesis of the one or more objects;
      storing the one or more neural radiance field models in a collection database, wherein the collection database is associated with the object type-specific collection;
      generating one or more view synthesis images with the one or more neural radiance field models based on the request data, and wherein the one or more view synthesis images comprise one or more renderings of the one or more objects;
      obtaining a plurality of additional user image datasets, wherein each of the plurality of additional user image datasets were generated with the user computing device;
      processing each of the plurality of additional user image datasets with one or more object determination models to determine a subset of the plurality of additional user image datasets comprise a respective object of the particular object type;
      training a respective additional neural radiance field model for each respective additional user image dataset of the subset of the plurality of additional user image datasets; and
      storing each respective additional neural radiance field model in the collection database.

2. The system of claim 1, wherein the particular object type is associated with one or more articles of clothing.

3. The system of claim 1, wherein the operations further comprise:
   providing the one or more view synthesis images to a user computing system for display.

4. The system of claim 1, wherein the request data is associated with a context, wherein the context is descriptive of at least one of an object context or an environment context.

5. The system of claim 1, wherein the operations further comprise:
   providing a virtual object user interface to a user computing system, wherein the virtual object user interface provides the one or more view synthesis images for display, wherein the one or more objects are isolated from an original environment depicted in the user image data.

6. The system of claim 1, wherein the one or more view synthesis images are generated by:
   processing a position and view direction with the one or more neural radiance field models to generate one or more predicted density values and one or more color values; and
   generating the one or more view synthesis images based on the one or more predicted density values and the one or more color values.

7. The system of claim 1, wherein the request data is descriptive of one or more adjustment settings; and
   wherein generating the one or more view synthesis images with the one or more neural radiance field models based on the request data comprises adjusting one or more color values of a set of predicted values generated by the one or more neural radiance field models.

8. The system of claim 1, wherein the request data is descriptive of a particular position and a particular view direction; and wherein generating the one or more view synthesis images with the one or more neural radiance field models based on the request data comprises processing the particular position and the particular view direction with the one or more neural radiance field models to generate a view rendering of the one or more objects descriptive of a view associated with the particular position and the particular view direction.

9. A computer-implemented method for virtual closet generation, the method comprising:

obtaining, by a computing system comprising one or more processors, a plurality of user images, wherein each of the plurality of user images comprise one or more articles of clothing, wherein the plurality of user images are associated with a plurality of different articles of clothing;

training, by the computing system, a respective neural radiance field model for each respective article of clothing of the plurality of different articles of clothing, wherein each respective neural radiance field model is trained to generate one or more view synthesis renderings of a particular respective article of clothing;

storing, by the computing system, each respective neural radiance field model in a collection database; and providing, by the computing system, a virtual closet interface, wherein the virtual closet interface provides a plurality of clothing view synthesis renderings for display based on the plurality of respective neural radiance field models, wherein the plurality of clothing view synthesis renderings are associated with at least a subset of the plurality of different articles of clothing, wherein the plurality of clothing view synthesis renderings are generated based on one or more uniform pose parameters and one or more uniform lighting parameters.

10. The method of claim 9, wherein the plurality of user images are automatically obtained from a storage database associated with a particular user based on obtained request data.

11. The method of claim 9, wherein the plurality of user images are selected from a corpus of user images based on at least one of metadata, one or more user inputs, or one or more classifications.

12. The method of claim 9, further comprising:

accessing, by the computing system, a storage database associated with a user; and processing, by the computing system, a corpus of user images with one or more classification models to determine the plurality of user images that comprise one or more objects classified as clothing.

13. The method of claim 9, wherein the virtual closet interface comprises one or more interface features to view a clothing ensemble comprising two or more articles of clothing displayed simultaneously.

14. One or more non-transitory computer-readable media that collectively store instructions that, when executed by one or more computing devices, cause the one or more computing devices to perform operations, the operations comprising:

obtaining a plurality of user image datasets, wherein each user image dataset of the plurality of user image datasets is descriptive of one or more images comprising one or more objects, wherein the one or more images were generated with a user computing device;

processing the plurality of user image datasets with one or more classification models to determine a subset of the plurality of user image datasets that comprises features descriptive of one or more particular object types;

training a plurality of neural radiance field models based on the subset of the plurality of user image datasets, wherein each respective neural radiance field model is trained to generate a view synthesis of one or more particular objects of a respective user image dataset of the subset of the plurality of user image datasets;

generating a plurality of view synthesis renderings with the plurality of neural radiance field models, wherein the plurality of view synthesis renderings are descriptive of a plurality of different objects of the particular object type;

determining a first set of user image datasets comprising features descriptive of a first object sub-type and associating a respective first set of neural radiance models with a first object sub-type label;

determining a second set of user image datasets comprising features descriptive of a second object sub-type and associating a respective second set of neural radiance models with a second object sub-type label;

receiving an ensemble rendering request, wherein the ensemble rendering request is descriptive of a request to generate a view rendering of a first object of the first object sub-type and a second object of the second object sub-type; and generating an ensemble view rendering with a first neural radiance field model of the respective first set of neural radiance field models and a second neural radiance field model of the respective second set of neural radiance field models, wherein the ensemble view rendering comprises image data descriptive of the first object and the second object in a shared environment; and providing a user interface for viewing the plurality of view synthesis renderings.

15. The one or more non-transitory computer-readable media of claim 14, wherein the user interface comprises a rendering pane for viewing the plurality of view synthesis renderings.

* * * * *